(12) United States Patent
Zimmerer

(10) Patent No.: US 7,938,606 B2
(45) Date of Patent: May 10, 2011

(54) EXPANDING SCREW

(75) Inventor: Claudia Zimmerer, Lindau (DE)

(73) Assignee: Hilti Aktiengesellschaft, Schaan (LI)

( * ) Notice: Subject to any disclaimer, the term of this patent is extended or adjusted under 35 U.S.C. 154(b) by 793 days.

(21) Appl. No.: 11/897,388

(22) Filed: Aug. 30, 2007

(65) Prior Publication Data

US 2008/0056841 A1   Mar. 6, 2008

(30) Foreign Application Priority Data

Sep. 4, 2006  (DE) .......................... 10 2006 000 438

(51) Int. Cl.
*F16B 13/06*   (2006.01)

(52) U.S. Cl. .......................... 411/55; 411/80.1; 411/412

(58) Field of Classification Search .................... 411/55, 411/412, 414, 411, 416, 80.1–80.6, 311
See application file for complete search history.

(56) References Cited

U.S. PATENT DOCUMENTS

| | | | | |
|---|---|---|---|---|
| 19,805 A * | 3/1858 | Whiting | ......................... | 411/414 |
| 178,028 A * | 5/1876 | Rogers | ......................... | 411/414 |
| 196,309 A * | 10/1877 | Pierce | ......................... | 411/414 |
| 449,887 A * | 4/1891 | Rogers | ......................... | 411/411 |
| 1,764,053 A * | 6/1930 | Reed et al. | ...................... | 470/10 |
| 1,890,093 A * | 12/1932 | Neff | .................................. | 27/5 |
| 3,661,046 A * | 5/1972 | Waud et al. | ................... | 411/369 |
| 3,861,269 A * | 1/1975 | Laverty | .......................... | 411/413 |
| 4,437,804 A * | 3/1984 | Fischer | ........................... | 411/59 |
| 4,749,322 A * | 6/1988 | Sygnator | ..................... | 411/387.3 |
| 4,948,314 A * | 8/1990 | Kurosaki | ...................... | 411/182 |
| 5,688,090 A * | 11/1997 | Miyamoto | ...................... | 411/55 |
| 5,749,688 A * | 5/1998 | Wakai | ............................ | 411/42 |
| 6,287,044 B1 * | 9/2001 | Huber | ........................... | 403/297 |
| 6,419,435 B1 * | 7/2002 | Gaudron | ....................... | 411/412 |
| 6,896,460 B2 | 5/2005 | Enomoto | | |
| 6,945,729 B2 * | 9/2005 | Yasuda | ......................... | 403/408.1 |
| 2007/0160440 A1 * | 7/2007 | Langewiesche | .............. | 411/386 |

FOREIGN PATENT DOCUMENTS

| | | |
|---|---|---|
| DE | 21 32 755 | 1/1971 |
| DE | 30 62 677 | 10/1981 |
| DE | 30 43 478 | 7/1982 |
| DE | 34 29 585 | 2/1986 |

\* cited by examiner

*Primary Examiner* — Flemming Saether

(74) *Attorney, Agent, or Firm* — Abelman, Frayne & Schwab

(57) ABSTRACT

An expanding screw for an expandable dowel sleeve (31) has a shaft (12) having a rotation-transmitting element (15) provided at its first end (13), at least one first screw thread (19) extending from its second end (17), and a thread section (21) provided in a region of the at least one first thread (19), spaced from the second end (17), and having at least one further screw thread (23).

10 Claims, 1 Drawing Sheet

EXPANDING SCREW

BACKGROUND OF THE INVENTION

1. Field of the Invention

The present invention relates to an expanding screw for an expandable dowel sleeve and including a shaft provided with rotation-transmitting means at its first end and at least one screw thread extending from its opposite second end.

2. Description of the Prior Art

For attachment of add-on parts, in particular for a through-assembly, anchorable attachment devices, which include an expendable dowel sleeve and an expanding screw that serves as an expanding member for the dowel sleeve, are used in solid and hollow constructional components. A dowel sleeve, which is formed, e.g., of a plastic material, is inserted in a preliminary formed, in a constructional component, borehole and is widened with the expanding screw that is driven or screwed in the dowel sleeve. The dowel sleeve material is displaced toward the borehole wall, producing a friction-/formlocking connection of the dowel sleeve with the borehole wall. In order to achieve high load value with the attachment, it is desirable that expansion forces, which are generated by the expanding screw, were high.

In order to increase expansion forces, German Publication DE 30 12 177 A proposes an expanding screw in which the core diameter of the screw shaft is greater than the core diameter of the shaft in the region of the thread section of the expanding screw, and the axial extent of the expansion region of the dowel sleeve is longer than the axial extent of the thread section. In the set condition, the section of the expanding screw having a larger diameter project into the expansion region of the dowel sleeve, permitting to realize high expansion forces.

The drawback of the expanding screw of DE 30 12 177 A consists in the absence of a tooth engagement of the expanding screw with the dowel sleeve. As a result, the attachment can become loose even upon application of a small load, in particular with hollow constructional components such as, e.g., encountered in hollow brickwork.

German Publication DE 34 29 585 discloses an expanding screw for an expandable dowel sleeve and including a shaft having first and second ends, rotation-transmitting means provided at the first end and at least one screw thread extending from the second end. At a distance from the second end, the expanding screw has a thread section in which the screw thread has a greater outer diameter than in the region between this thread section and the second end. The greater outer diameter of the thread in the region of the thread section, which is spaced from the second end, provides for a tooth-like engagement of the expanding screw with the dowel sleeve, preventing the danger of the screw passing through the dowel sleeve.

The drawback of the expanding sleeve of DE 34 29 585 A1 consists in a very small, hardly noticeable increase of the torque that need be applied for screwing the expanding screw in the dowel sleeve. When the expanding screw has, as shown in DE 34 29 585 A1, a screw head at the first end of the shaft, and the screw is completely screwed in, upon application of a further torque, the screw would rotate at the same place, which would damage the dowel sleeve at least in some area and would reduce the obtainable holding values. Also, the preload of the attachment can disappear, so that the add-on part would remain only loosely secured to a constructional component. Furthermore, with the design of the expanding screw according to DE 34 29 585 A1, manufacturing costs of producing such an expanding screw are noticeably increased.

Accordingly, an object of the present invention is to provide an expanding screw for an expandable dowel sleeve and an attachment device with such an expanding screw, which would insure a reliable retention of the expanding screw in the dowel sleeve upon generation of high expansion forces, and easy manufacturing of the expanding screw.

SUMMARY OF THE INVENTION

This and other objects of the present invention, which will become apparent hereinafter, are achieved by providing, in the region of the at least one first screw thread, a thread section spaced from the second end of the shaft and having at least one further screw thread.

Thus, the thread section of the expandable screw, which is spaced from the second end of the screw shaft, has a multi-lead thread. Advantageously, the at least one first screw thread extending from the second shaft end, and the spaced from the second shaft end, at least one further screw thread form, in the thread section which is spaced from the second shaft end, a two-lead thread.

In the region between the second shaft end and a region of the thread section which is spaced from the second end and in which only the at least one first screw thread is provided, there is sufficient space between the flights of the at least one first screw thread for receiving the displaced dowel material. The at least one first screw thread has a constant pitch along the entire axial extent of the expanding screw. As soon as the spaced from the second end, thread section with the at least one further thread engages the dowel sleeve, the necessary torque for driving the expanding screw in continuously increases. The at least one first screw thread engages continuously the grooves, which are formed at the start of the driving-in process, whereas the at least one further screw thread of the spaced from the second end, thread section must form a new groove. Because between the screw threads in the region of the spaced from the second end, thread section, there is little space available, for receiving the displaced dowel material, a larger portion of this material is pressed outwardly against the borehole wall, which insures high expansion forces and, thus, a reliable attachment.

In addition, the thread of the spaced from the second shaft end, thread section provides for a tooth engagement of the expanding screw with the dowel sleeve, which simultaneously provides a substantial amount of the screw material for generation of higher expansion forces in the constructional component.

Advantageously, the spaced from the second shaft end, thread section extends into the expansion region of the dowel sleeve in the set condition, so that a cross-section of the expanding sleeve in the thread section is available for expanding the expansion region of the dowel sleeve and for generation of higher expansion forces. In the hollow constructional components, usually, anchoring takes place only in region adjacent to the borehole mouth. Therefore, the spaced from the second shaft end, thread section advantageously is so arranged on the shaft of the expanding screw that in the set condition, the largest expansion forces are produced in that region. If in the set condition, the thread-free region of the screw shaft likewise projects into the dowel sleeve, and an expansion force is also generated in the region of the dowel sleeve associated with the thread-free region of the screw.

The expansion sleeve is formed, e.g., of metal such as steel, e.g. Thus, a stainless steel can be used for the manufacturing of the inventive expanding screw. For an easy screwing in of the expanding screw into the dowel sleeve or for protection from corrosion, the expanding screw can be provided with a coating. The dowel sleeve is advantageously formed of a plastic material.

Advantageously, the at least one further screw thread has a same outer diameter as the at least one first screw thread. This provides for an easy manufacturing of the inventive expanding screw and insures that the expanding screw can be easily screwed in the dowel sleeve. The easy manufacturing is insured by the constant outer diameter of the expanding screw, except the thread run-out region at the second shaft end. The thread-free region of the shaft between the spaced from the second end, thread section and the rotation-transmitting means advantageously has a core diameter that corresponds to the outer diameter of the screw threads or, alternatively, is somewhat larger than the screw thread outer diameter. Advantageously, the at least one further screw thread has the same pitch as the at least one first screw thread, whereby the thread can be formed in a single operational step. In addition, with both screw threads having the same pitch, the screw-in process of the expanding screw is not obstructed by discontinuity of the screw threads. Advantageously, the at least one further thread is arranged in the middle of the at least one first screw thread.

Advantageously, the flank angle of both screw threads is the same. This insures an advantageous cutting-in or penetration behavior of the screw threads into the wall of the dowel sleeve.

Advantageously, the core diameter of the shaft in the region of the thread section with at least one further screw thread is greater than the core diameter of the shaft in the region between the thread section with the at least one further screw thread and the second shaft end. Thereby, a larger amount of the screw material is available in the region of the thread section with the at least one further screw thread in comparison with the front region of the shaft adjacent to the second end. This permits to realize higher expansion forces in the region of the thread section with the at least one further thread, which positively influences the holding values of expanding screw.

Advantageously, the at least one first screw thread is formed, at least in the region between the thread section with the at least one further screw thread and the second shaft end, as a round thread. This provides for an easy driving of the expansion screw into the dowel sleeve at the start of the expansion process.

Advantageously, at least one of the screw threads is formed, at least in the region of the thread section with the at least one further screw thread, as an trapezoidal thread, which insures a good tooth engagement between the expansion screw and the dowel sleeve. Advantageously, the trapezoidal thread has rounded edges, which insures an easy screwing-in of the expanding screw. In particular, in combination with a greater core diameter in the region of the spaced from the second end, thread section, the trapezoidal thread enables an easy introduction of the load over the expanding screw into the dowel sleeve. It is particularly advantageous when both screw threads are formed as trapezoidal threads in the thread section with the at least one further screw thread.

Advantageously, the rotation-transmitting means at the first shaft end is formed as a screw head having, at its bottom, a plurality of spaced from each other, elevations. At the end of the setting process these elevations penetrate in the free end of the dowel sleeve that is provided advantageously with a collar, providing an additional tooth engagement of the expanding screw with the dowel sleeve, which prevents over-rotation of the expanding screw.

An inventive attachment device includes a dowel sleeve having an expansion region, and an expanding screw for the expandable dowel sleeve, which was described above, with an axial extent of the thread region with the at least one further screw thread being smaller than an axial extent of the expansion region of the dowel sleeve. Thereby, a portion of the cross-section of the expanding screw in the region of the thread section with at least one further screw thread is available for expanding the expansion region of the dowel sleeve and, thereby, for producing of a greater expansion force.

The novel features of the present invention, which are considered as characteristic for the invention, are set forth in the appended claims. The invention itself, however, both as to its construction and its mode of operation, together with additional advantages and objects thereof, will be best understood from the following detailed description of the preferred embodiment, when read with reference to the accompanying drawings.

BRIEF DESCRIPTION OF THE DRAWINGS

The drawings show.

In all of the figure of the drawings the same elements are designated with the same reference numerals.

DETAILED DESCRIPTION OF THE PREFERRED EMBODIMENT

Figure 1:
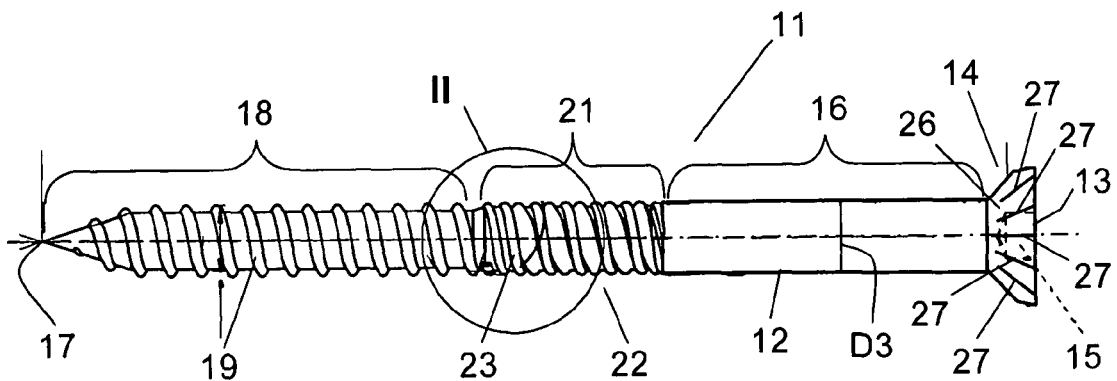
FIG. 1 a side view of an expanding screw according to the present invention.
Figure 2:
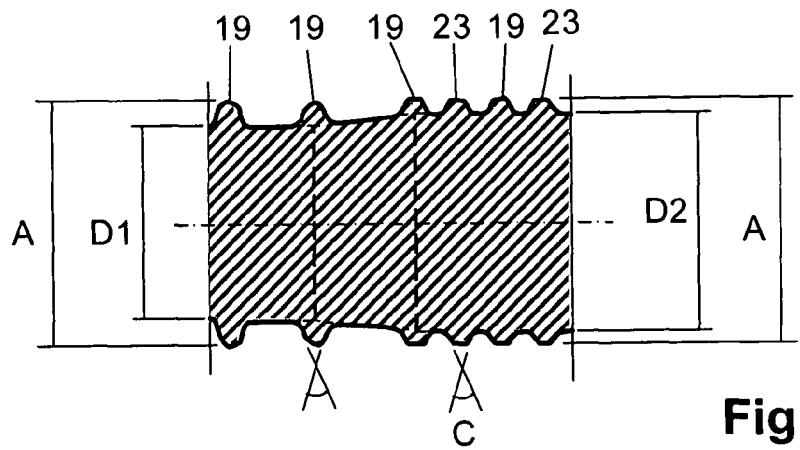
FIG. 2 a cross-sectional view showing detail II in FIG. 1.

An expanding screw 11 according to the present invention for an expandable dowel sleeve, which is shown in FIGS. 1 and 2, includes a shaft 12 at a first end 13 of which, there is provided a screw head 14 with an inner hexagon which functions as rotation-transmitting means 15. The shaft 12 further includes a first screw thread 19 with a constant pitch extending from a second end 17 of the shaft 12. The first screw thread 19 has a constant diameter A, except the thread run-out toward the free, second end 17 of the shaft 12. On the thread section 21 of the first screw thread 19 spaced from the second end 17, there is provide a second screw thread 23 for forming a two-lead thread 22 in the region of the first screw thread 19. The screw thread 23 has the same outer diameter A and the same pitch as the first screw thread 19. The flank angle C of both threads 19 and 23 is also the same.

The core diameter D2 of the shaft 12 in the region of the thread section 21 with a further screw thread 23 is greater than the core diameter D1 of the shaft 12 in the region 18 between the thread section 21 with the further screw thread 23 and the second end 17 of the shaft 12. Between the thread section 21 with the further screw thread 23 and the screw head 14, the shaft 12 has a thread-free region 16 the core diameter D3 of which corresponds essentially to the outer diameter A of the first screw thread 19 and the second screw thread 23. The first screw thread 19 is formed as a round thread in the region 18 between the thread section 21 with a further screw thread 23 and the second end 17 of the shaft 12. The first screw thread 19 and the second screw thread 23 are formed in the thread region 21 spaced from the second end 17 of the shaft 12 as rounded trapezoidal threads.

At the bottom side 26, the screw head 14 has a plurality of spaced from each other, elevations 27. Upon the expanding screw 11 being screwed in, the elevations 27 contact the free end of the dowel sleeve and penetrate thereinto. Thereby, there is provided a further toothing engagement of the expanding screw 11 with the dowel sleeve, which prevents over rotation of the expanding screw 11.

Figure 3:
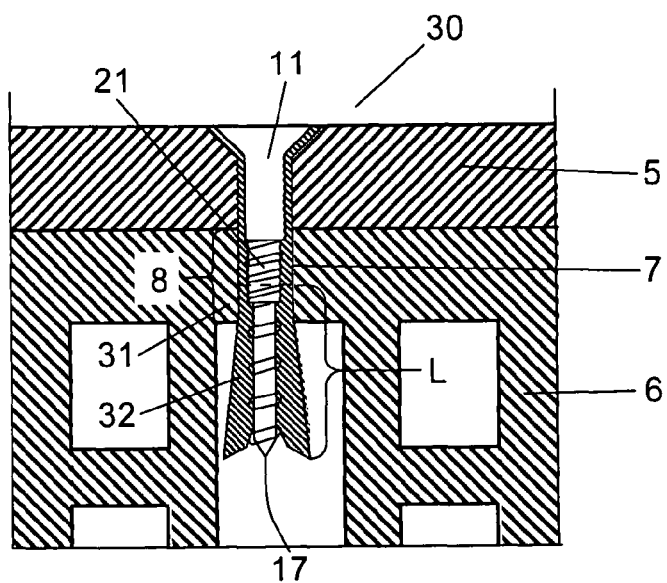
FIG. 3 a schematic cross-sectional view showing an attachment device according to the present invention in a set condition.

FIG. 3 shows an inventive attachment device 30 for securing an add-on part 5 to the hollow brick 6 forming a constructional component. The attachment device 30 consists of an expandable dowel sleeve 31 with an expansion region 32, and the expanding screw 11. The axial extent of the region 18 between the thread section 21 with the further screw thread 23 and the second end 17 of the shaft 12 of the expanding screw 11 is smaller than the axial extent L of the expansion region 32 of the dowel sleeve 31.

In the hollow brick 6, a borehole 7 is formed, and the dowel sleeve 31 is inserted in the borehole 7 through an opening in the add-on part 5. Then, the expanding screw 11 is screwed in, expanding the dowel sleeve 31. The spaced from the free second end 17, thread section 21 is so arranged that in the set condition of the attachment device 30, the largest expansion forces act in the region 8 of the hollow brick 6 adjacent to the borehole mouth.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. An attachment device, comprising a dowel sleeve (31) having an expansion region (32); and means for expanding the dowel sleeve (31) and having a shaft (12) with first (13) and second ends (17), rotation-transmitting means (15) provided at the first end (13), at least one first screw thread (19) extending from the second end (17), and at least one further multi-lead screw thread (23) provided in a thread region (21) of the at least one first thread (19) spaced from the second end (17), an axial extent of the thread region (21) with the at least one further multi-lead screw thread (23) being smaller than an axial extent (L) of the expansion region (32) of the dowel sleeve (31).

2. An attachment device according to claim 1, wherein the at least one further multi-lead screw thread (23) has a same outer diameter (A) as the at least one first screw thread (19).

3. An attachment device according to claim 1, wherein the at least one further multi-lead screw thread (23) has a same pitch as the at least one first screw thread (19).

4. An attachment device according to claim 1, wherein the at least one further multi-lead screw thread (23) has a same flank angle (C) as the at least one first screw thread (19).

5. An attachment device according to claim 1, wherein a core diameter (D2) of the shaft (12) in the thread region (21) with the least one further multi-lead screw thread (23) is greater than a core diameter (D1) of the shaft (12) in a region (18) between the thread region (21) with the at least one further multi-lead screw thread (23) and the second end (17) of the shaft (12).

6. An attachment device according to claim 1, wherein the at least one first screw thread (19) is formed as a round thread in a region (18) between the thread region (21) with the at least one further multi-lead screw thread (23) and the second end (17) of the shaft (12).

7. An attachment device according to claim 1, wherein at least one of the at least one first screw thread (19) and the at least one further multi-lead screw thread (23) is formed in the thread region (21) with at least one further multi-lead screw thread (23) as a rounded acme thread.

8. An attachment device according to claim 1, wherein both the at least one first screw thread (19) and the at least one further multi-lead screw thread (23) are formed as acme threads.

9. An attachment device according to claim 1, wherein the rotation-transmitting means (15) is formed as a screw head (14) having, at a bottom (26) thereof, a plurality of spaced from each other, elevations (27).

10. An expanding anchor according to claim 1, wherein the at least one further multi-lead screw thread (23) is formed as a two-lead thread.

* * * * *